(12) United States Patent
Jensen et al.

(10) Patent No.: US 10,879,764 B2
(45) Date of Patent: Dec. 29, 2020

(54) ROTATION DEVICE AND METHOD FOR ROTATING A WIND TURBINE GENERATOR

(71) Applicant: SIEMENS GAMESA RENEWABLE ENERGY A/S, Brande (DK)

(72) Inventors: Brian Jensen, Brande (DK); Anders Kristian Lauridsen, Silkeborg (DK); Johnny Nygaard Lauridsen, Brande (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/269,693

(22) Filed: Feb. 7, 2019

(65) Prior Publication Data

US 2019/0252947 A1    Aug. 15, 2019

(30) Foreign Application Priority Data

Feb. 9, 2018   (EP) .................................. 18156080

(51) Int. Cl.
*H02K 7/18*      (2006.01)
*F03D 7/02*      (2006.01)
*F03D 80/00*     (2016.01)

(52) U.S. Cl.
CPC ............. *H02K 7/1838* (2013.01); *F03D 7/02* (2013.01); *F03D 7/026* (2013.01); *F03D 7/0264* (2013.01); *F03D 80/00* (2016.05)

(58) Field of Classification Search
CPC ......... H02K 7/1838; F03D 7/02; F03D 7/026; F03D 7/0264; F03D 80/00
See application file for complete search history.

(56) References Cited

U.S. PATENT DOCUMENTS

| | | | | |
|---|---|---|---|---|
| 4,565,929 A | * | 1/1986 | Baskin | .................. F03D 1/0658 290/44 |
| 2006/0159550 A1 | * | 7/2006 | Nagao | ....................... F01D 1/30 416/132 B |

(Continued)

FOREIGN PATENT DOCUMENTS

| | | |
|---|---|---|
| CN | 101749197 A | 6/2010 |
| CN | 102602751 A | 7/2012 |

(Continued)

OTHER PUBLICATIONS

Office action in related Taiwanese Patent Application No. 108104584, dated Nov. 4, 2019.

(Continued)

*Primary Examiner* — Sean Gugger
(74) *Attorney, Agent, or Firm* — Schmeiser, Olsen & Watts LLP (57) ABSTRACT

Provided is a rotation device for rotating a wind turbine generator configured to be rotated by wind and to convert wind energy into electrical energy. The rotation device includes at least one rotary device configured to couple with an outer surface of the wind turbine generator, and a motor device for driving the rotary device such as to thereby rotate the wind turbine generator about a generator rotation axis. The wind turbine generator can be rotated in a state in which the wind turbine is not operating. This can be useful for training purposes in a training nacelle, for maintenance purposes when storing the nacelle or during assembly of the nacelle.

14 Claims, 11 Drawing Sheets

(56) References Cited

U.S. PATENT DOCUMENTS

| | | | |
|---|---|---|---|
| 2006/0210406 A1* | 9/2006 | Harvey | F03D 7/02 417/334 |
| 2010/0156303 A1 | 6/2010 | Wulff | |
| 2010/0259045 A1* | 10/2010 | Vilbrrandt | F03D 7/0224 290/44 |
| 2011/0027006 A1* | 2/2011 | Hausladen | B66C 23/86 403/2 |
| 2011/0037333 A1* | 2/2011 | Atallah | H02K 49/102 310/98 |
| 2013/0009403 A1* | 1/2013 | Cornelius | F03D 9/00 290/55 |
| 2013/0106109 A1* | 5/2013 | Richert | F03D 7/0208 290/44 |
| 2013/0160109 A1 | 6/2013 | Klinghult | |
| 2013/0168968 A1 | 7/2013 | Dong et al. | |
| 2013/0302139 A1* | 11/2013 | Wittrisch | F03D 7/0204 415/14 |
| 2014/0061257 A1 | 3/2014 | Janssen et al. | |
| 2015/0059163 A1* | 3/2015 | Neumann | H02K 3/51 29/596 |
| 2015/0082743 A1 | 3/2015 | Moeller et al. | |
| 2016/0153423 A1* | 6/2016 | Neumann | H02K 3/51 29/732 |
| 2018/0112648 A1* | 4/2018 | Bond | F03D 9/255 |
| 2018/0287461 A1* | 10/2018 | Coman | H02K 11/0094 |

FOREIGN PATENT DOCUMENTS

| | | |
|---|---|---|
| CN | 104454392 A | 3/2015 |
| CN | 205687336 U | 11/2016 |
| EP | 1683965 A2 | 7/2006 |
| EP | 2434153 A1 | 3/2012 |

OTHER PUBLICATIONS

Office Action in corresponding Chinese Patent Application No. 20191011043.8 dated Apr. 15, 2020. 10 pages.

* cited by examiner

ROTATION DEVICE AND METHOD FOR ROTATING A WIND TURBINE GENERATOR

CROSS-REFERENCE TO RELATED APPLICATIONS

This application claims priority to EP Application No. 18156080.6 having a filing date of Feb. 9, 2018, the entire contents of which are hereby incorporated by reference.

FIELD OF TECHNOLOGY

The following relates to a rotation device for rotating a wind turbine generator and to a method for rotating said wind turbine generator.

BACKGROUND

During normal operation of a wind turbine, wind makes the blades of the wind turbine rotate. The blades can be connected to a wind turbine generator by a shaft system, thereby making the wind turbine generator rotate as the blades rotate. The rotation of the wind turbine generator can cause the wind turbine generator to convert wind energy into electrical energy.

It can be desired to rotate the wind turbine generator in a state in which the wind turbine is not operating normally, in particular in a state in which a nacelle of the wind turbine is dismounted from a wind turbine tower.

SUMMARY

An aspect relates to an improved rotation device for rotating a wind turbine generator. A further aspect relates to providing an improved method for rotating a wind turbine generator.

According to a first aspect, a rotation device for rotating a wind turbine generator configured to be rotated by wind and to convert wind energy into electrical energy is provided. The rotation device comprises:

at least one rotary device configured to couple with an outer surface of the wind turbine generator, and a motor device for driving the rotary device such as to thereby rotate the wind turbine generator about a generator rotation axis.

The wind turbine generator can be connected to blades of the wind turbine via a shaft system such that a rotation of the blades due to wind induces a rotation of the wind turbine generator. The rotational motion of the rotating wind turbine generator can be converted into electrical energy. It can be said that the wind turbine generator converts wind energy into electrical energy. In particular, the wind turbine generator is a direct drive generator for a direct drive wind turbine. Alternatively, it can be a geared wind turbine generator for a geared wind turbine. It may be arranged within a nacelle of a wind tower. In the following, the wind turbine generator is also referred to as "generator". The generator can have a cylindrical shape and be rotatable around a central generator rotation axis.

In embodiments, the rotation device is used to rotate the generator in a state in which the generator is not rotated by wind. For example, the rotation device can be used to rotate the generator of a dismounted wind turbine. In particular, the nacelle in which the generator is arranged is not mounted on a tower. The generator may be disconnected from the shaft system and/or from the blades of the wind turbine. For example, the generator is part of a nacelle that is stored prior to being mounted to a tower. Alternatively, the generator can be part of a nacelle that is not entirely assembled yet, for example a nacelle at an assembly stage. The generator may also be part of a training facility, in particular a training nacelle, which can be located in a warehouse.

The rotation device may be coupled to the generator through the rotary device. In particular, the rotary device is coupled to the outer surface of the generator by contacting said outer surface. There may be enough friction between the rotary device and the outer surface of the generator for inducing a rotation of the generator by a rotation of the rotary device. In particular, the rotation axis about which the generator is rotated by the rotation device is the same as an axis about which the generator would rotate due to wind. The rotation of the rotary device can be achieved using the motor device. The motor device may comprise an electric motor.

The control of the rotation of the generator can be performed in an automatic and/or in a manual manner, for example by a technician. The rotation device can be used to rotate the generator without using any wind power. The rotation of the generator can be performed in an automatic manner. This is in particular advantageous because the inertia of the generator can be overcome by the rotation device. In particular, the rotating mass of the generator and hub can exceed 100.000 kg. The rotation of the generator can be facilitated using the rotation device. In particular, this is useful in assembly stages in which a rotation of the generator is desired, when storing the generator or in training facilities to simulate winds. These examples as well as further applications of the rotation device will be described further below.

According to an embodiment, the rotary device is configured to support the wind turbine generator from below.

It may also be said that the rotary device holds the generator from below. In particular, the generator is supported by the rotary device. The rotation device may slightly lift up the generator. In embodiments, the rotation device is arranged underneath the generator. The rotation device may access the generator through an aperture or hatch at the bottom of the nacelle.

In embodiments, the rotary device can contact the generator from the top or from the side of the generator. In particular, the rotary device can be placed anywhere at 360° around the generator.

According to a further embodiment, the rotary device comprises at least one cylindrical roll which is configured to be rotated about a roll rotation axis when the rotary device is driven by the motor device, the roll rotation axis being parallel to the generator rotation axis.

In particular, the cylindrical roll is the part of the rotary device that couples with the generator for rotating the same. The cylindrical roll may be made of a relatively strong material to be able to support the generator and/or force the generator to rotate. For example, it can be a steel roller. To avoid damaging the outer surface of the generator, the cylindrical roll or steel roller can be coated by plastic, for example by polyurethane.

According to a further embodiment, the rotary device comprises at least one electric motor for rotating the at least one cylindrical roll about the roll rotation axis.

According to a further embodiment, the rotary device comprises a plurality of cylindrical rolls, in particular four cylindrical rolls, the roll rotation axis of which are arranged next to one another in a parallel manner; and/or the motor device comprises a plurality of electric motors, in particular four electric motors, which are respectively configured to drive one of the cylindrical rolls.

The cylindrical rolls may be arranged such that the outer surfaces thereof are all in contact with the outer surface of the generator. In particular, each cylindrical roll has an electric motor assigned thereto. The number of cylindrical rolls may be chosen as a function of the size of the cylindrical rolls, of a force of the generator on the cylindrical rolls, of the strength of the magnets of the generator and/or of a friction coefficient of the surface of the cylindrical rolls.

All cylindrical rolls may be identical to one other. The electric motors may also be identical to each other. Each electric motor can have a gearbox and/or an encoder assigned thereto or built therein. The encoder may count the number of rotations of the cylindrical roll assigned to the electric motor. The number of rotations of the generator can then be derived therefrom.

In embodiments, the motor device further comprises at least one thermistor and/or at least one external cooling unit coupled with the at least one electric motor for protecting the electric motor. The external cooling unit may cool down the electric motor coupled thereto when it gets too hot. The lifetime of the electric motor may thereby be extended.

According to embodiments, the plurality of cylindrical rolls are arranged in pairs in roll sets which are mounted on the support at a pivot point. The roll set can be rotated around the pivot point. Thereby, the cylindrical rolls can be orientated such as to maximize the contact surface with the outer surface of the generator and the rotation of the generator can be facilitated. In particular, the four cylindrical rolls of the rotation device can be arranged in two roll sets.

According to a further embodiment, the rotation device is configured to rotate the generator by 0 to 5, in particular by 0.05 to 0.3, preferably by 0.1 to 0.2 rounds per minute (RPM).

This rotation speed of the generator in particular corresponds to a rotation speed of a generator operating in an idle mode. In other words, the rotation device may simulate a generator operating in idle mode, which can be useful for training purposes.

According to a further embodiment, the rotation device comprises a support device for holding the rotary device, the support device being configured to elevate and lower the rotary device and/or the motor device such that the rotary device couples with the outer surface of the generator in an elevated position and such that the rotary device is separated from the outer surface of the generator in a lowered position; the support device in particular comprising a hydraulic system for elevating and lowering the rotary device and/or the motor device.

The support device may move the rotary device and/or the motor device between the elevated and the lowered position. In particular, the rotation device can easily be placed below generator in the lowered position. In embodiments, the rotary device is retractable.

Once placed correctly under the generator, the rotary device and/or the motor device can be elevated using the support device to reach the elevated position. In particular, in the elevated position, the rotary device couples the generator such as to be able to rotate it. The support device may automatically elevate the rotary device and/or motor device, for example using the hydraulic system. As an alternative to the hydraulic system, the support device can elevate and lower the rotary device and/or the motor device electrically.

According to a further embodiment, the support device comprises at least two support arms on which the rotary device and/or the motor device are arranged, the support arms being connected to each other in a rotatable manner at a central point.

According to a further embodiment, the roll rotation axis is inclined at a predetermined angle with respect to a horizontal reference plane such as to match an inclination angle of the generator rotation axis.

In particular, the roll rotation axis is inclined by the same amount as the generator rotation axis. Thereby, a contact surface between the cylindrical roll and the generator can be increased. This can allow for an improved friction between the outer surface of the generator and a surface of the cylindrical roll, which may facilitate the rotation of the generator by the cylindrical roll.

The predetermined angle may be between 5 and 7°, preferably between 5.8 and 6.2°.

According to a further embodiment, the rotation device further comprises:
a control unit for starting and stopping the rotation device, adjusting the rotation speed of the generator, adjusting the predetermined angle, adjusting a ramp-up speed of the generator, adjusting a force applied on the generator by the rotation device, emergency stopping the rotation device and/or adjusting a torque of the rotary device;
a battery unit for supplying the rotation device with electrical power;
a displacing device, in particular wheels, for displacing the rotation device;
at least one distance sensor for determining a distance between the rotation device and an obstacle and/or object;
a brush for cleaning the outer surface of the generator; and/or
an encoder device for determining a number of rotations of the wind power generator induced by the rotation device.

The control unit can be used to control the rotation device. It can comprise a user interface with a display for indicating current settings of the rotation device and/or buttons for changing the current settings. The control unit may comprise a remote control unit for performing at least some of the tasks of the control unit. In particular, the starting and stopping of the rotation device is exclusively implemented via a remote control device of the control unit. Thereby, safety can be improved.

Adjusting the predetermined angle can help compensating for irregularities of the ground. In particular, the contact surface between the rotation device and the outer surface of the generator can be maximized.

By providing the rotation device with a battery unit, the flexibility of the rotation device can be improved, because it does not have to be constantly connected to a power source such as to the mains.

The displacing device can also improve the flexibility of the rotation device because it can thereby be moved around with less effort. In particular, no crane is necessary for displacing the rotation device.

With the distance sensor, it can be made sure that the rotation device does not collide with any objects such as a nacelle, a vehicle or humans. Thereby, damaging the rotation device or the nacelle or injuring humans can be prevented.

The brush may be a rotatable brush. It can be used to clean the outer surface of the generator before the rotation device comes into contact with the outer surface of the generator. Thereby, is can be avoided that any dirt gets between the generator and the rotary device, thus preventing damaging the outer surface of the generator and/or the rotary device.

The brush may be a cylindrical brush having a brush rotation axis that is parallel to the roll rotation axis.

The encoder device can be coupled to each motor device. Alternatively or in addition, the encoder device can be part of a separate cylindrical roll contacting the outer surface of the generator and having an encoder axis that is parallel to the generator rotation axis. The encoder device or encoder devices can provide an information about the number of rotations of the generator. In particular, by analyzing signals from the encoder device(s), it can be determined if the cylindrical rolls undesirably slip on the outer surface of the generator. In such a case, the position of the rotation device can be corrected.

According to a further embodiment, the rotation device is further configured to rotate a main bearing of the wind turbine such that grease provided inside the main bearing is uniformly distributed and/or such that stand still marks on the inside of the main bearing are avoided, the main bearing being configured to be rotated by wind energy.

In particular, the main bearing is the main shaft bearing of the wind turbine. The main bearing may be coupled to the generator by the shaft system such as to be rotated when the generator is rotated. For example, a rotation of the generator also induces a rotation of the main bearing.

When the main bearing is not rotated for a while, for example because the wind turbine is dismounted, there is a risk that all the grease of the bearing moves to the bottom of the bearing. When no grease remains at the top of the bearing, corrosion can occur. To prevent this, it can be useful to rotate the main bearing regularly, for example every 14 weeks while the nacelle is being long-term stored. In particular, the main bearing is rotated for at least one hour such that it rotates by approximately 5 rounds, in particular by 5.33 rounds.

Moreover, when the bearing is not rotated for a while, there is also a risk that stand still marks occur on the inside of the bearing. These may later cause uneven runs of the bearing, resulting in premature damaging of the bearing and in a reduction of the lifetime of the bearing. The risk of stand still marks may be reduced by rotating the main bearing as already explained above.

According to a second aspect, a method for rotating a wind turbine generator configured to be rotated by wind energy and to convert the wind energy into electrical energy is provided. The method comprises:

coupling at least one rotary device with an outer surface of the wind turbine generator, and driving the rotary device using a motor device such as to rotate the wind turbine generator about a generator rotation axis.

According to an embodiment, the method further comprises:

rotating the wind turbine generator in a state in which the wind turbine generator is not rotated by wind energy;

rotating the wind turbine generator such as to simulate winds;

rotating a main bearing of the wind turbine and/or a main shaft of the wind turbine by rotating the wind turbine generator with the rotary device;

rotating the wind turbine generator, the main bearing and/or the main shaft during assembly of a nacelle of the wind turbine such as to access different parts of the wind turbine generator, the main bearing and/or the main shaft and facilitating the assembly; and/or rotating the wind turbine generator such as to fix gutter shields all around the wind turbine generator.

Indeed, even when the generator of an operating wind turbine is in the idle mode, it can rotate due to the winds. This state can be modelled be rotating the generator of a nonoperating wind turbine with the rotation device. The simulation of winds may thus be relevant for training purposes. For example, the generator of a training nacelle can be rotated using the rotation device to simulate the generator in the idle mode. This training nacelle can be used to teach wind turbine personal how to lock the wind turbine before sending them onto real wind turbines on the field.

The generator may be connected to the main shaft and/or the main bearing of the wind turbine. The main shaft may connect a hub of the wind turbine, to which the blades are attached, to the generator. A rotation of the generator with the rotation device can induce a rotation of the main shaft and/or main bearing.

In particular, the rotation of the main shaft and/or main bearing is useful during the assembly or manufacturing of the nacelle. Indeed, the rotation of the main shaft and/or main bearing can allow the personal responsible for the assembly to gain access to different parts of the main shaft, main bearing and/or generator. For example, such a rotation allows to access all the bolts for fixing the hub to the generator, the bolts being arranged at 360° around the main shaft.

Further, rotating the generator can be useful when fixing the gutter shields. The gutter shields can be used to protect the generator and may be placed at 360° around the generator. To fix the gutter shields at the assembly stage of the nacelle, the generator may have to be rotated to access all sides of the generator and to fix the gutter shields on all sides thereof.

According to a further embodiment, the method is executed using the rotation device according to the first aspect or according to an embodiment of the first aspect.

The embodiments and features described with reference to the rotation device apply mutatis mutandis to the method.

According to a third aspect, a system comprising the rotation device and the wind turbine generator is provided.

Further possible implementations or alternative solutions of the embodiments of the invention also encompass combinations—that are not explicitly mentioned herein—of features described above or below with regard to the embodiments. The person skilled in the art may also add individual or isolated aspects and features to the most basic form of the embodiments of the invention.

BRIEF DESCRIPTION

Some of the embodiments will be described in detail, with reference to the following figures, wherein like designations denote like members, wherein.

DETAILED DESCRIPTION

In the Figures, like reference numerals designate like or functionally equivalent elements, unless otherwise indicated.

Figure 1:
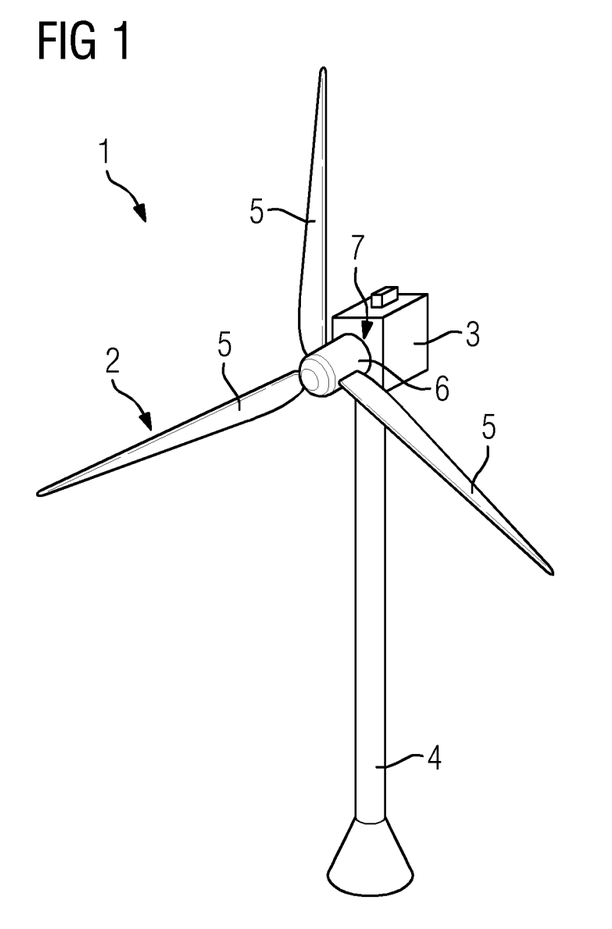
FIG. 1 shows a first example of a wind turbine.

FIG. 1 shows a first example of a wind turbine 1.

The wind turbine 1 comprises a rotor 2 connected to a wind turbine generator 7 arranged inside a nacelle 3. The nacelle 3 is arranged at the upper end of a tower 4 of the wind turbine 1.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads.

The wind causes the rotor 2 to rotate, in turn causing the generator 7 to rotate. The generator 7 converts the wind energy into electrical energy.

FIG. 1 shows a wind turbine 1 in its most general form. In general, in wind turbines, it can be distinguished between direct drive wind turbines and geared wind turbines. These are described below in view of FIGS. 2 and 3.

Figure 2:
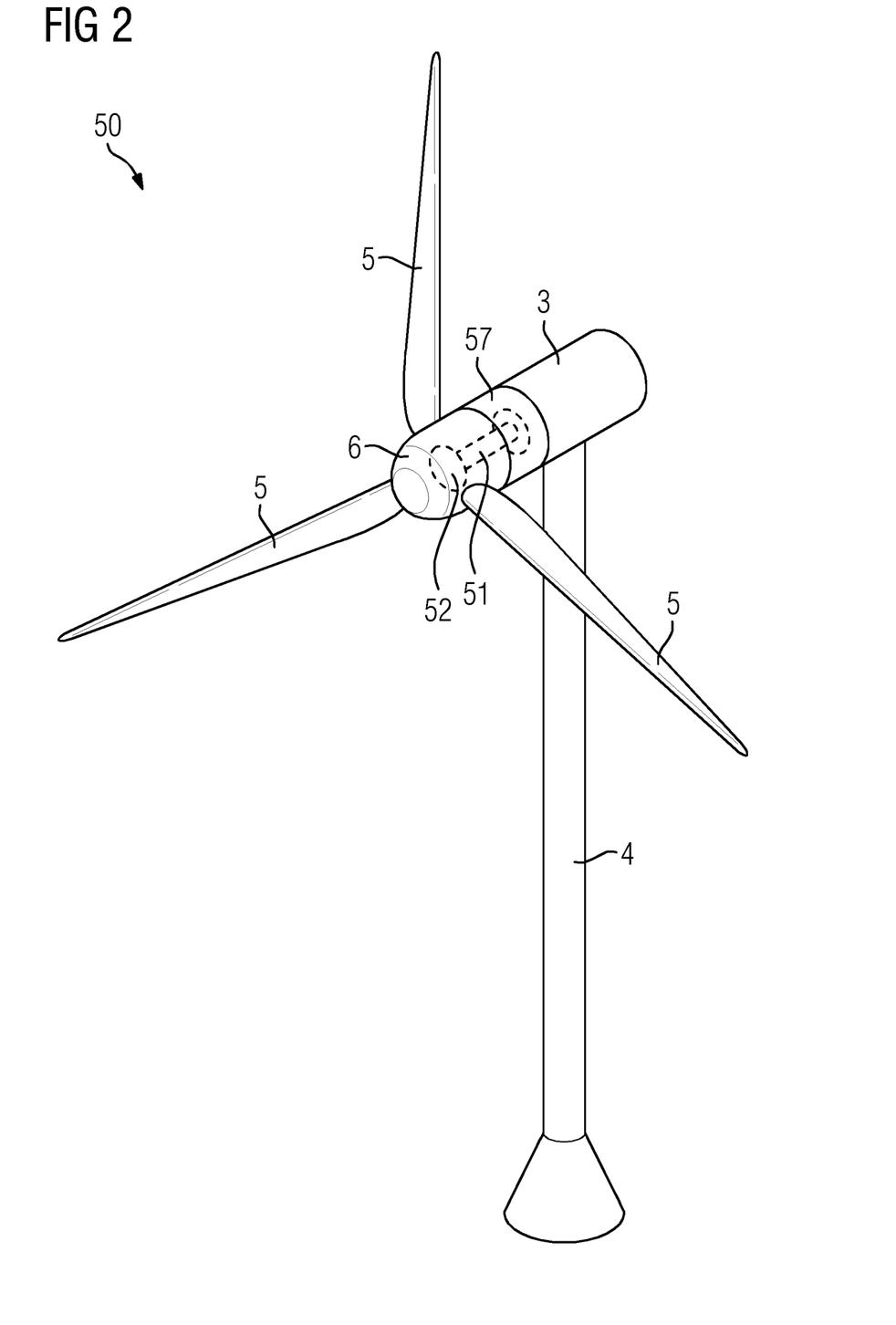
FIG. 2 shows a second example of a wind turbine.

FIG. 2 shows a second example of a wind turbine 50. The wind turbine 50 is a direct drive wind turbine. In the wind turbine 50, the hub 6 is directly connected to a generator 57, without any gearbox arranged therebetween. The generator 57 is thus a direct drive generator. The rotation of the blades 5 due to the wind is directly transmitted to the generator 57 via a main shaft 51 connected to the hub and comprising a main bearing 52. When the wind turbine 50 is in operation, the generator 57 converts wind energy into electrical energy.

Figure 3:
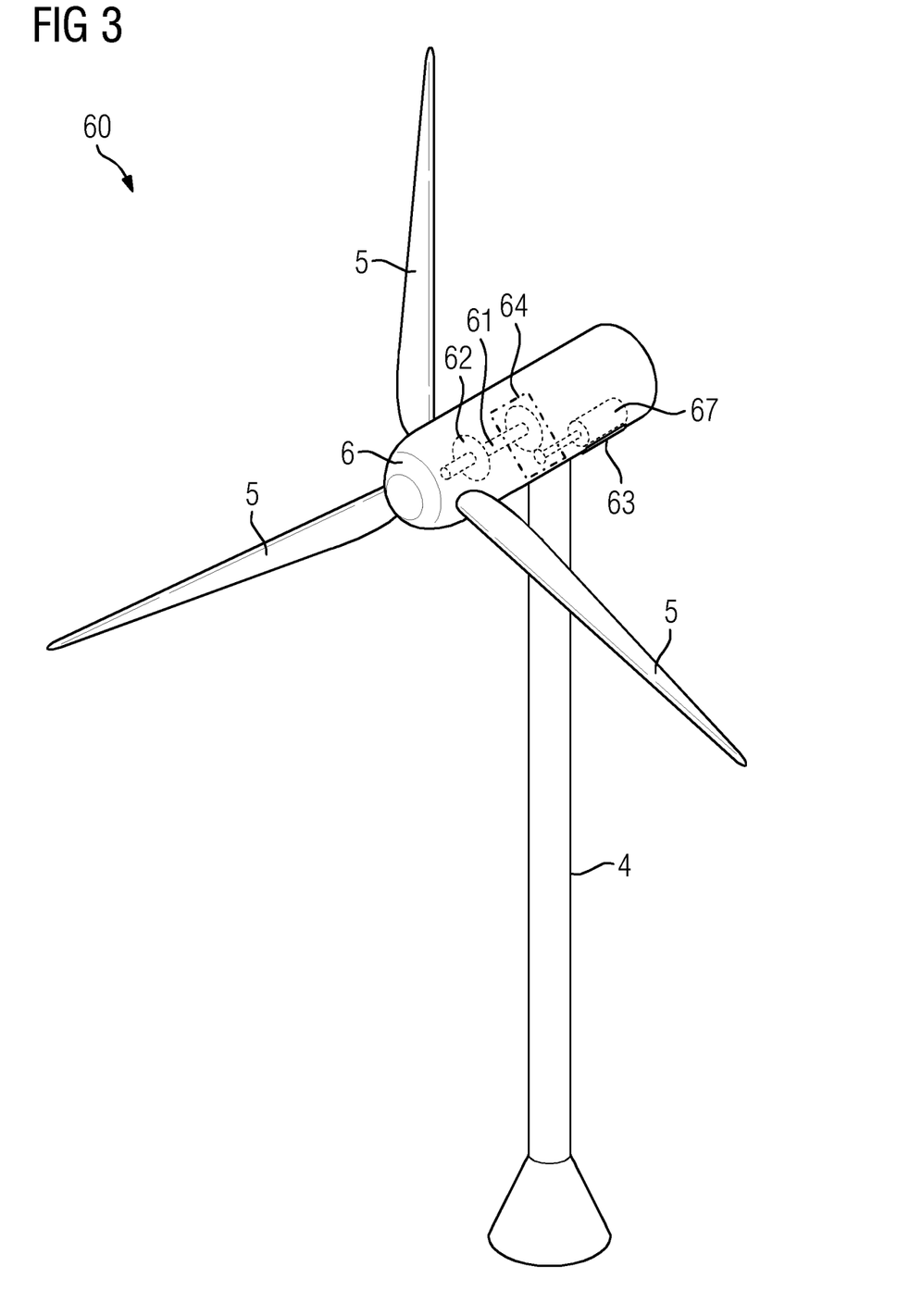
FIG. 3 shows a third example of a wind turbine.

FIG. 3 shows a third example of a wind turbine 60. The wind turbine 60 differs from the wind turbine 50 of the second example in that it is a geared wind turbine.

The wind turbine 60 comprises a gearbox 64, which is arranged between the hub 6 and a geared generator 67. FIG. 3 provides a very simplified representation of the gearbox 67. As shown in FIG. 3, the gearbox 64 is connected to the hub 6 through a main shaft 61 having a main bearing 62.

On the bottom of the nacelle 3 in the representation of FIG. 3, there is provided a hatch 63, the role of which will be explained further below.

Figure 4:
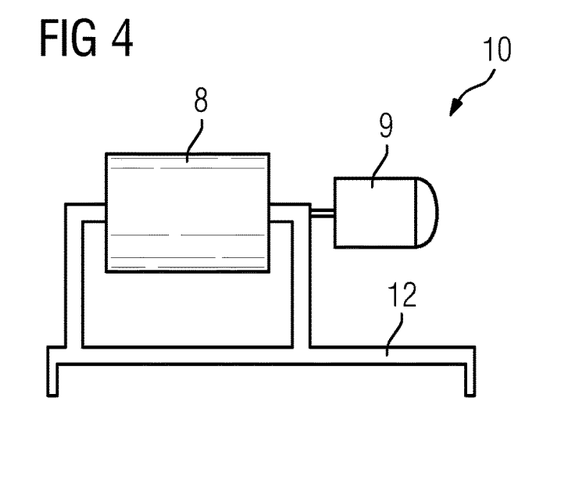
FIG. 4 shows a rotation device according to a first embodiment.

FIG. 4 shows a rotation device 10 according to a first embodiment. The rotation device 10 comprises a rotary device 8 and a motor device 9. Optionally, the rotation device 10 further comprises a support device 12 for holding the rotary device 8 and the motor device 9.

The motor device 9 can drive the rotary device 8. The rotation device 10 can be placed underneath a generator 7, 57, 67 such that the rotation device 9 drives the generator 7, 57, 67.

Figure 5:
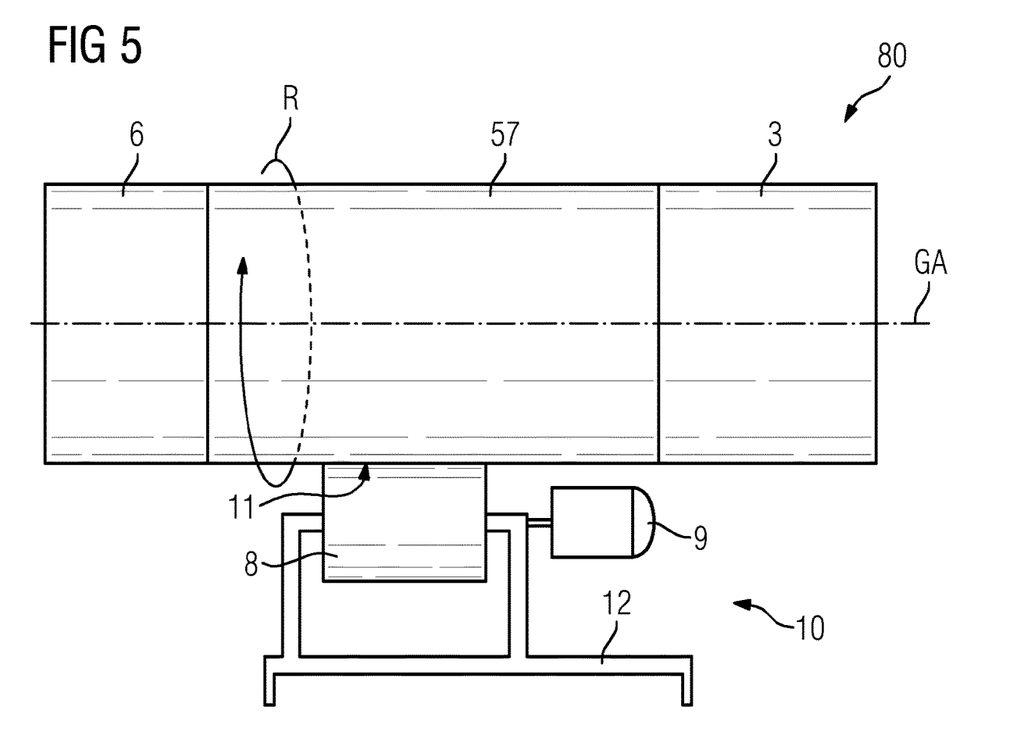
FIG. 5 shows a system comprising the rotation device according to the first embodiment and a generator.

FIG. 5 shows the rotation device 10 rotating the generator 57 of the wind turbine 50. The generator 57 and the rotation device 10 form a system 80. In the example of FIG. 5, the nacelle 3 of the wind turbine 50 is in the dismounted state. This means that it is not placed on the tower 4, but is rather being stored. The nacelle 3 of FIG. 5 is stored for training purposes. Alternatively, the nacelle 3 could also be stored prior to be mounted onto the tower 4 or the nacelle 3 can be in the process of being assembled. As shown in FIG. 5, the blades 5 have been removed from the hub 6 such that no rotation of the generator 57 due to wind can occur.

The rotation device 10 is placed under the generator 57 such that the rotary device 8 couples with an outer surface 11 of the generator 57. Coupling here means that the rotary device 8 is in contact with the outer surface 11 of the generator 57. When coupling with the generator 57, the rotation device 10 slightly lifts up the generator 57 such that the friction force between the outer surface 11 of the generator 57 and the rotary device 8 is increased.

The motor device 9 drives the rotary device 8 which thereby rotates the generator 57 about a generator rotation axis GA. The rotation of the generator 57 is indicated by the rotation direction R. The generator rotation axis GA here coincides with the direction along which the main shaft 51 extends.

In FIG. 5, the rotation device 10 rotates the generator 57. Similarly, the rotation device 10 can be used to rotate the generators 7 or 67. To rotate the generator 67, the hatch 63 provided at the bottom of the nacelle 3 of the wind turbine 60 (FIG. 3) can be opened such that the rotary device 8 can enter in contact with the generator 67 when it is placed underneath it.

Figure 6:
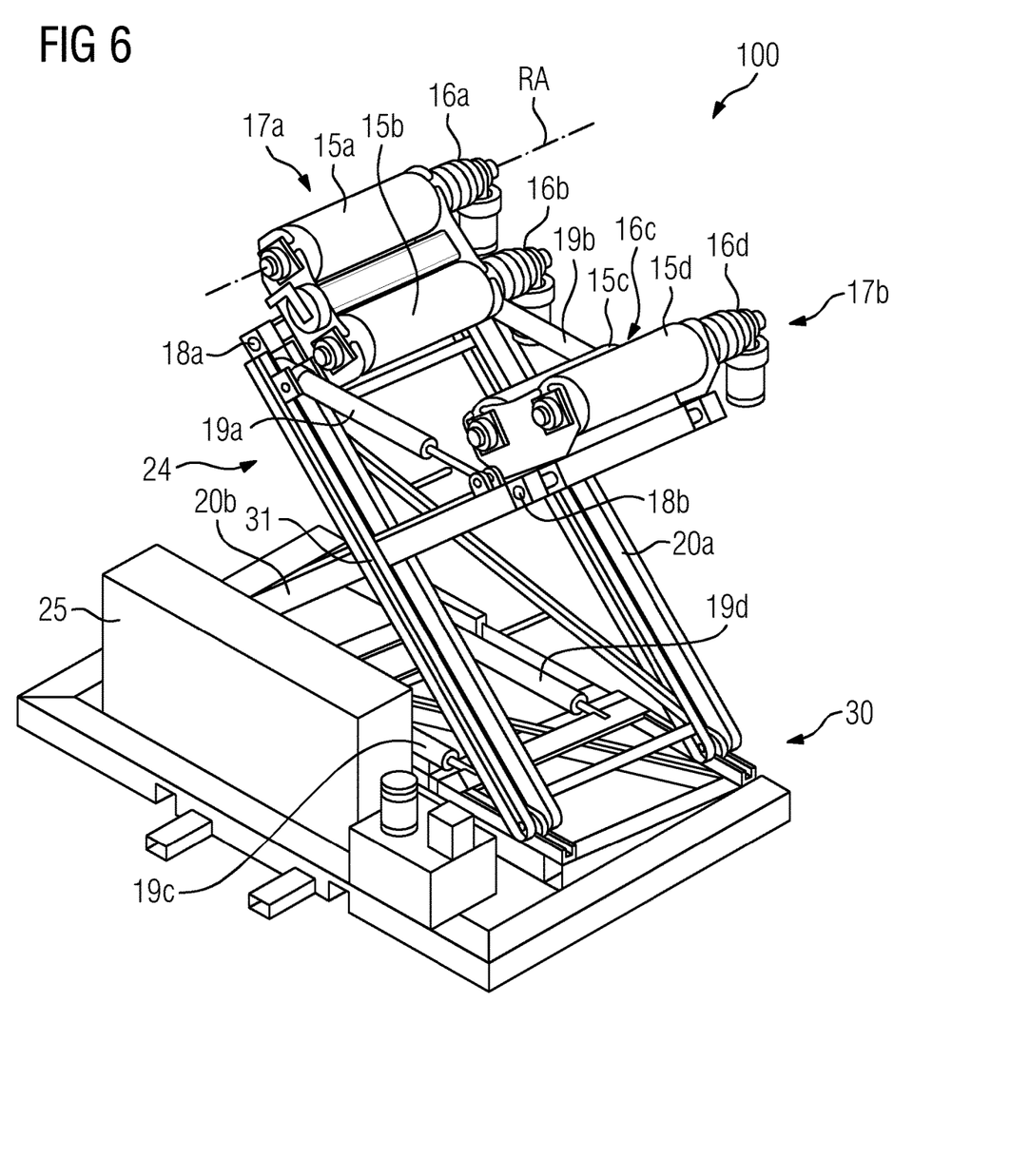
FIG. 6 shows a first view of a rotation device according to a second embodiment.

FIG. 6 shows a first view of a rotation device 100 according to a second embodiment. The rotation device 100 can be used similarly to the rotation device 10 according to the first embodiment to rotate the generator 7, 57, 67. The rotation device 100 comprises four cylindrical rolls 15a-15d that form the rotary device 8. The four cylindrical rolls 15a-15d are arranged in parallel to one another. In the following, the cylindrical rolls 15a-15d are also referred to as "rolls" 15a-15d.

Each roll 15a-15d has a roll rotation axis RA. FIG. 6 only shows one such rotation axis RA, but it is understood that the rolls 15b, 15c and 15d each also have such a rotation axis RA.

The rotation device 100 can be placed underneath a generator 7, 57, 67 for rotating the same. The rotation device 100 is placed such that the rotation axis RA of each roll 15a-15d are parallel to the rotation axis GA of the generator 7, 57, 67. Each roll 15a-15d then touches the outer surface 11 of the generator 7, 57, 67.

Each roll 15a-15d is made of steel coated with polyurethane to avoid damaging the outer surface of the generator 7, 57, 67 when entering in contact therewith.

Each roll 15a-15d has an electric motor 16a-16d coupled therewith. The electric motors 16a-16d are part of the motor device 9 of the rotation device 100. To each electric motor 16a-16d, there is associated a gearbox as well as a cooling system for avoiding that the electric motor 16a-16d overheats (not shown in the Fig.).

The rolls 15a-15d are arranged in pairs in two roll sets 17a, 17b. The rolls 15a and 15b are part of the roll set 17a while the rolls 15c and 15d are part of the roll set 17b. Each roll set 17a, 17b has a pivot point 18a, 18b around which the roll set 17a, 17b is rotatable. Rotating the rolls sets 17a, 17b allows to adapt the rotation device 100 to the shape of the generator 7, 57, 67 such as to increase a contact surface between the rolls 15a-15d and the outer surface 11 of the generator 7, 57, 67. Thereby, the generator 7, 57, 67 can be rotated more efficiently using the rotation device 100 and the rotation device 100 can be used to rotate generators 7, 57, 67 having different diameters.

The rolls 15a-15d and the electric motors 16a-16d are supported by a retractable support device 30. The support device 30 comprises two pairs of support arms 20a, 20b that are fixed to each other in a rotatable manner at central points 31.

The support device 30 allows to elevate and lower the rolls 15a-15d and electric motors 15d by means of a hydraulic elevation system 24. The hydraulic elevation system 24 comprises four hydraulic cylinders 19a-19d or pistons that can be extended and retracted using a hydraulic pump, an oil tank and a pressure accumulator provided in the box 25.

Figure 7:
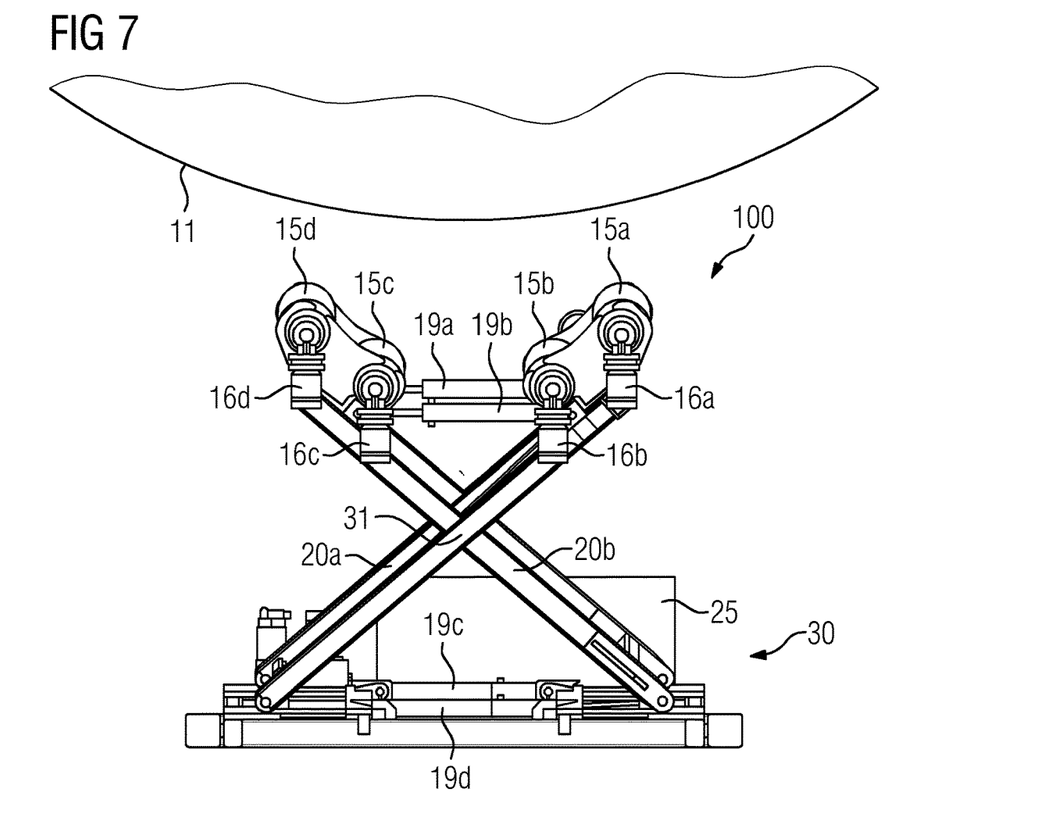
FIG. 7 shows a second view of the rotation device according to the second embodiment.

In an elevated position (as shown in FIGS. 6 and 7), the pairs of support arms 17a, 17b form an X-shape with one another.

The rolls 15a-15d can be elevated using the support device 30 so that they contact the outer surface 11 of the generator 7, 57, 67. Once the rolls 15a-15d contact the outer surface 11 of the generator 7, 57, 67, they can be elevated further until they push the generator 7, 57, 67 up. Then, the rolls 15a-15d can be driven by the electric motors 16a-16d to make the generator 7, 57, 67 rotate.

Once the generator 7, 57, 67 has sufficiently been rotated by the rotation device 100, the support device 30 can be lowered again, such that the rolls 15a-15d no longer touch the outer surface of the generator 7, 57, 67 and such as to release the generator 7, 57, 67.

Figure 8:
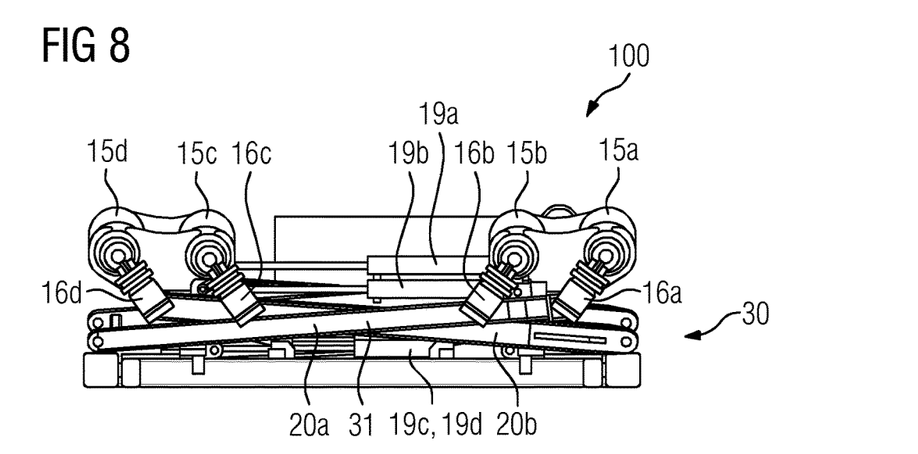
FIG. 8 shows a third view of the rotation device according to the second embodiment.

FIG. 8 shows a view of the rotation device 100 in a lowered position. In FIG. 8, the hydraulic cylinders 19a-19d are extended at maximum and the support device 30 is in a retracted position. In the retracted position, the rotation device 100 is less space consuming and easier to handle, in particular easier to move around.

Figure 9:
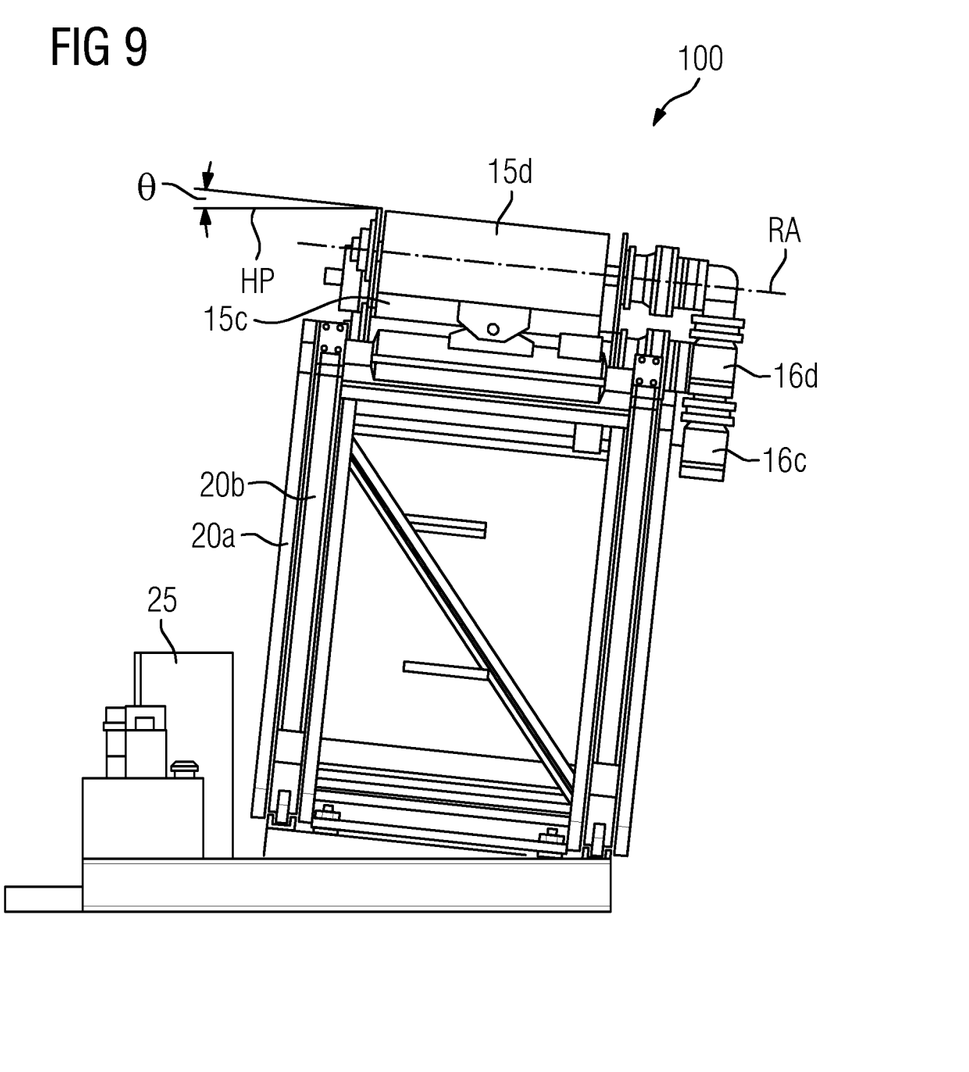
FIG. 9 shows a fourth view of the rotation device according to the second embodiment.

FIG. 9 shows a fourth view of the rotation device 100 according to the second embodiment. As shown in FIG. 9, the roll rotation axis RA of the rolls 15a-15d are inclined at a predetermined angle θ with respect to a horizontal reference plane HP. The predetermined angle θ is normally set to 6° to match an inclination angle of the outer surface 11 of the generator 7, 57, 67 (see FIGS. 10 and 11). Thereby, the contact surface between the rolls 15a-15d and the outer surface 11 of the generator 7, 57, 67 is maximized. The predetermined angle θ can be adjusted using the control unit to compensate for irregularities in the floor.

Figure 10:
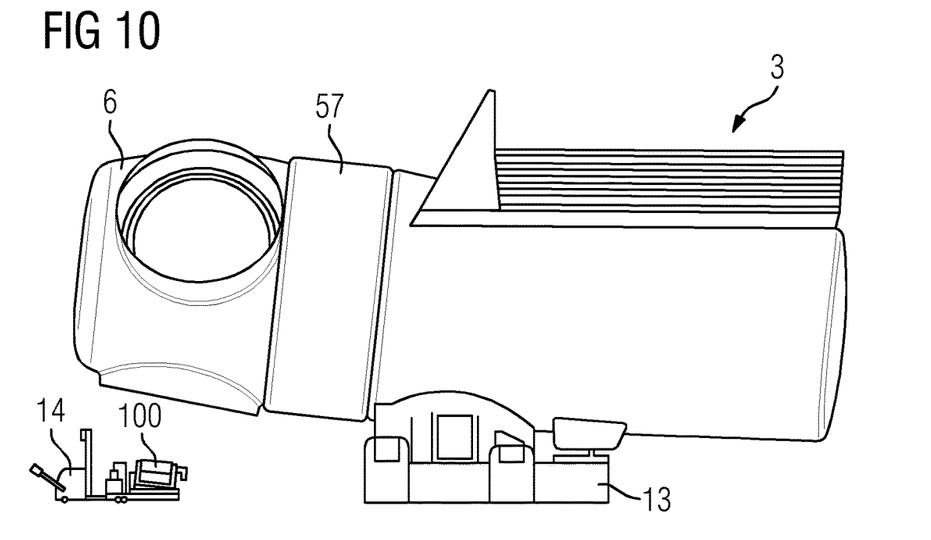
FIG. 10 shows an example of a nacelle that is not mounted on a wind turbine tower.

FIG. 10 shows an example of a nacelle 3 that is not mounted on a wind turbine tower 4. The nacelle 3 is being stored prior to being mounted to the wind turbine tower 4. The nacelle 3 is laying on a nacelle support 13.

As shown in FIG. 10, the rotation device 100 can be transported by a forklift 14 and be placed under the generator 57 of the stored nacelle 3. Once it is properly placed under the nacelle, the forklift 14 can drive away and leave the rotation device 100 under the generator 57. The rotation device 100 is then extended using the hydraulic elevation system 24 of the support device 30 described in view of FIG. 6-8.

Figure 11:
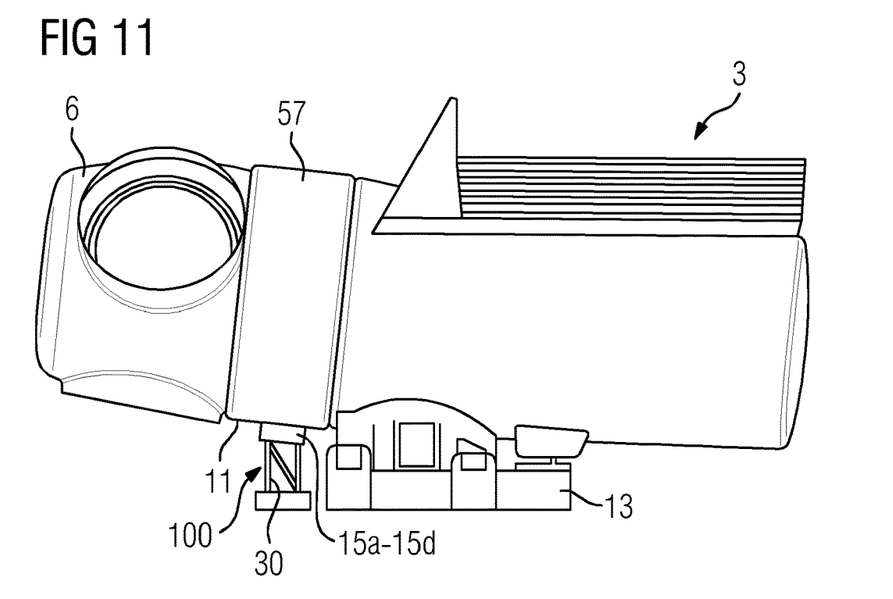
FIG. 11 shows another example of a nacelle that is not mounted on a wind turbine tower.

The rotation device 100 is extended until the rolls 15a-15d touch the outer surface 11 of the generator 57 and lift the generator 57 up slightly, as shown in FIG. 11. In FIG. 11, the nacelle no longer lays on the nacelle support 13. Rather, it is supported by the rotation device 100.

The electric motors 16a-16d of the rotation device 100 are activated to rotate the generator 57. The rotation of the generator 57 induced a rotation of the main shaft 51 and of the main bearing 52.

Rotating the main bearing 52 accounts for grease within the bearing 52 to be properly distributed. Thereby, it is avoided that parts of the bearing 52 are without grease for too long, which would result in an increased risk of corrosion. Further, rotating the main bearing 52 reduced stand still marks occurring when the main bearing 52 is not rotated for too long. Thus, rotating the main bearing 52 using the rotation device 100 increases the lifetime of the main bearing 52.

Typically, during storing of the nacelle 3 on the ground, as shown in FIGS. 10 and 11, the main bearing 52 is rotated every 14 days for about an hour, which corresponds to about 5 turns of the main bearing 52. It is also possible to rotate the generator 57 and hence the main bearing 52 continuously, for example during transport of the nacelle 3 on the sea for being mounted offshore.

Figure 12:
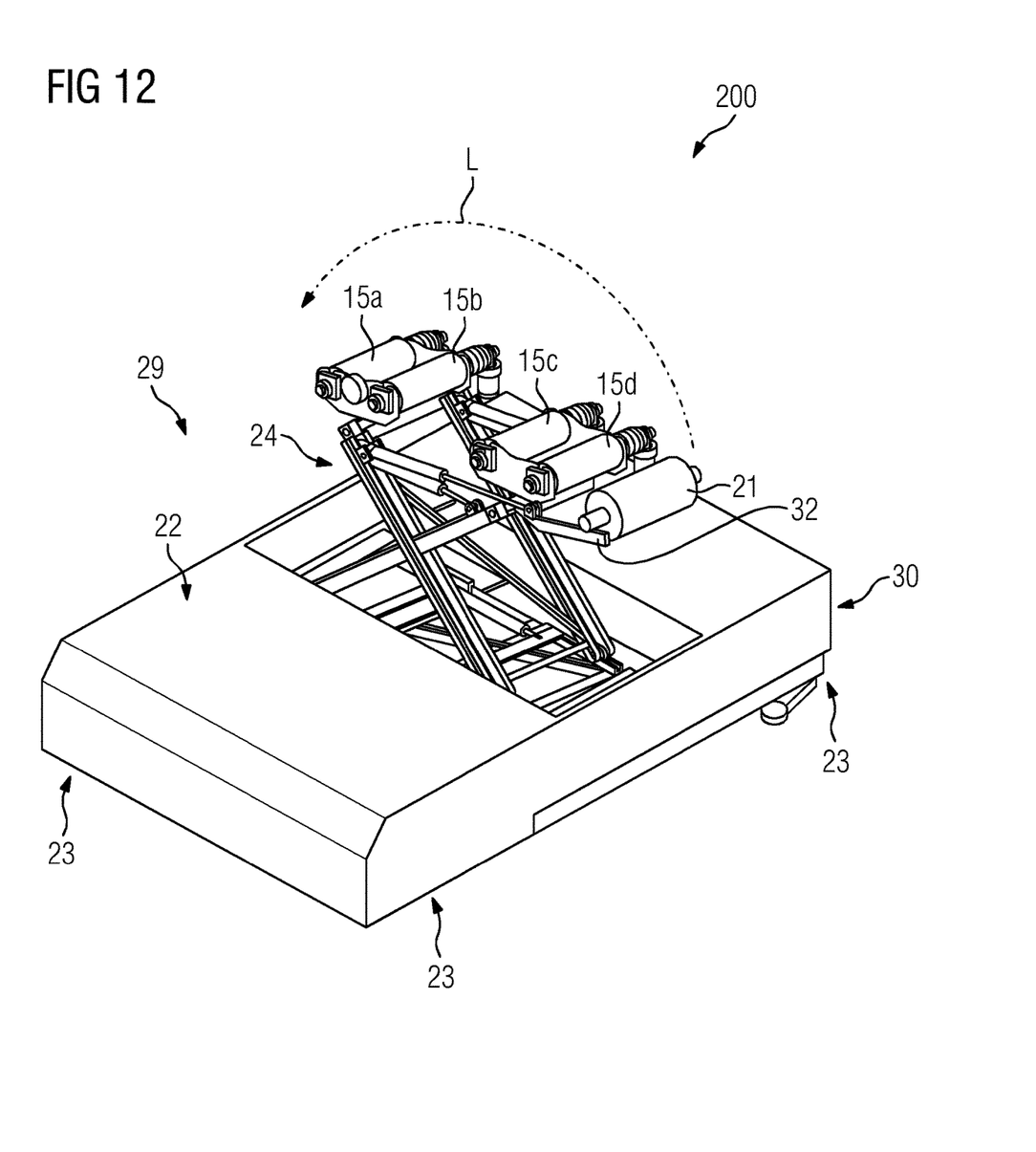
FIG. 12 shows a rotation device according to a third embodiment.

FIG. 12 shows a rotation device 200 according to a third embodiment. The rotation device 200 according to the third embodiment resembles the rotation device 100 according to the second embodiment. In addition to the features already described in view of the rotation device 100, the rotation device 200 comprises a vehicle 29.

Said vehicle 29 comprises a battery unit 22 with which the rotation device 200 can be autonomous. The vehicle 29 further comprises wheels 23 as a displacing device for facilitating displacements of the rotation device 200. The rotation device 200 can autonomously move around using the wheels 23 and being powered by energy from the battery unit 22.

Moreover, the rotation device 200 is provided with a brush 21 which has a cylindrical shape and is arranged in parallel to the rolls 15a-15d. The brush 21 is attached to the support device 30 though a brush arm 32, which allows for a rotation of the brush 21 along the dashed line L. The brush 21 can be activated before the support device 30 reaches the elevated position in which the rolls 15a-15d touch the outer surface 11 of the generator 7, 57, 67. The brush 21 then wipes along the outer surface 11 of the generator 7, 57, 67 to remove dust and dirt from said surface 11. Thereby, when the support device 30 elevates the rolls 15a-15d further, the rolls 15a-15d come into contact with a clean surface 11 of the generator 7, 57, 67 and damaging of the surface 11 of the generator 7, 57, 67 and/or of the rolls 15a-15d can be prevented.

Figure 13:
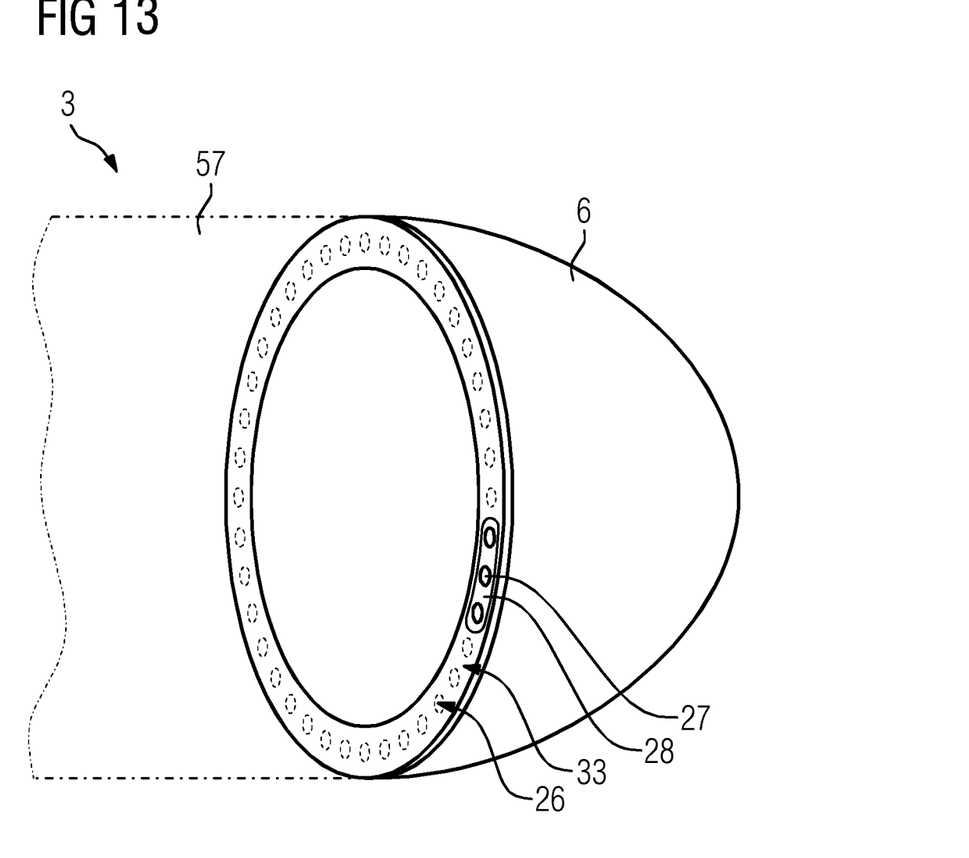
FIG. 13 shows an example of a nacelle being assembled.

FIG. 13 shows an example of a nacelle 3 being assembled. As part of the assembly process of the nacelle 3, the hub 6 needs to be attached to the generator 57. To this purpose, the hub 6 is provided with a bolt circle 26 and the generator 57 is provided with a corresponding nut circle 33. Each bolt 27 of the bolt circle 26 has to be fixed to a nut of the nut circle 33. The fixing of the hub 6 to the generator 57 is made difficult because not all bolts 27 of the bolt circle 26 are accessible at the same time. Namely, only the bolts 27 visible through an access hole 28 can be accessed at each time. A detailed view of the access hole 28 viewed from the generator 57 towards the hub 6 is provided in FIG. 14.

Figure 14:
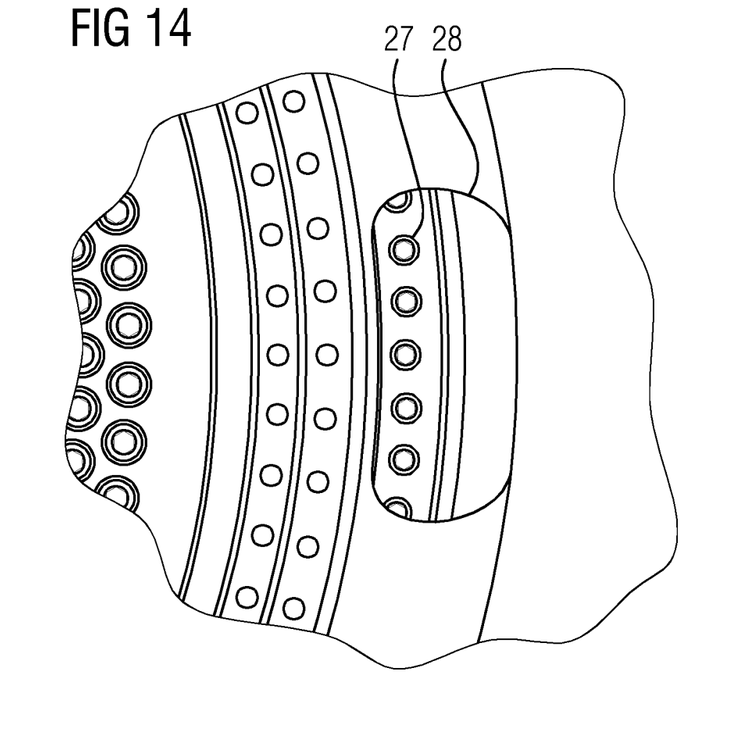
FIG. 14 shows a more detailed view of the example of the nacelle being assembled.

To fix all the bots 27 to the nuts, the access hole 28 needs to be rotated with respect to the bolt circle 26 and nut circle 33. This rotation can be performed by the rotation device 10, 100, 200 described above by rotating the generator 57. Thus, the rotation of the generator 57 using the rotation device 10, 100, 200 facilitates the assembly of the nacelle 3.

Figure 15:
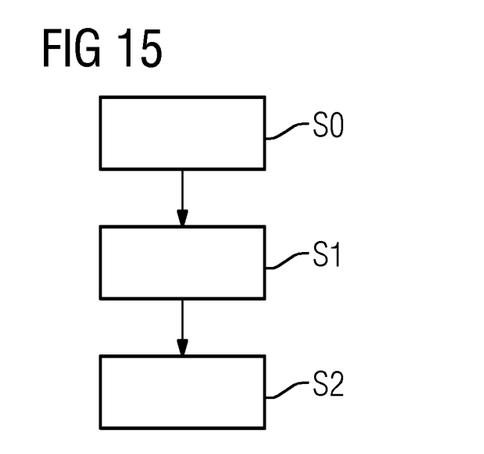
FIG. 15 shows a method for rotating a wind turbine generator according to an embodiment.

FIG. 15 shows a method for rotating a wind turbine generator 7, 57, 67 according to an embodiment.

In a step S0, the generator 7, 57, 67 is provided. In a step S1, the rotary device 8 is coupled with the outer surface 11 of the generator 7, 57, 67. In as step S2, the rotary device 8 is driven using the motor device 9 such as to rotate the generator 7, 57, 67 about the generator rotation axis GR.

Although the present embodiments of the invention have been described in accordance with preferred embodiments, it is obvious for the person skilled in the art that modifications are possible in all embodiments. For example, it is possible to provide each electric motor 16*a*-16*d* with an encoder for determining the number of rotations of the corresponding roll 15*a*-15*d* and to derive the number of rotations of the generator 7, 57, 67 therefrom. The control unit may comprise a remote control for turning the rotation device 7, 57, 67 ON/OFF. Furthermore, the rotation device 10, 100, 200 can be used to rotate the generator 7, 57, 67 such as to attach gutter shields all around the generator 7, 57, 67.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A rotation device for rotating a wind turbine generator that is configured to be rotated by wind and to convert wind energy into electrical energy, the rotation device comprising:
   at least one rotary device configured to couple with an outer surface of the wind turbine generator; and
   a motor device for driving the at least one rotary device such as to thereby rotate the wind turbine generator about a generator rotation axis which coincides with a direction along which a main shaft of a wind turbine extends;
   wherein the rotation device comprises a support device for holding the at least one rotary device, the support device being configured to elevate and lower the at least one rotary device such that the at least one rotary device couples with the outer surface of the wind turbine generator in an elevated position and such that the at least one rotary device is separated from the outer surface of the wind turbine generator in a lowered position.

2. The rotation device according to claim 1, wherein the at least one rotary device is configured to support the wind turbine generator from below.

3. The rotation device according to claim 1, wherein the at least one rotary device comprises at least one cylindrical roll which is configured to be rotated about a roll rotation axis when the at least one rotary device is driven by the motor device, the roll rotation axis being parallel to the generator rotation axis.

4. The rotation device according to claim 3, wherein the at least one rotary device comprises at least one electric motor for rotating the at least one cylindrical roll about the roll rotation axis.

5. The rotation device according to claim 3, wherein:
   the at least one rotary device comprises a plurality of cylindrical rolls, the roll rotation axis of which being arranged next to one another in a parallel manner; and/or
   the motor device comprises a plurality of electric motors, which are respectively configured to drive one cylindrical roll of the plurality of cylindrical rolls.

6. The rotation device according to f claim 1, wherein the rotation device is configured to rotate the wind turbine generator by 0.05 to 0.3 rounds per minute.

7. The rotation device according to claim 1, wherein the support device comprises a hydraulic system for elevating and lowering the at least one rotary device and/or the motor device.

8. The rotation device according to claim 7, wherein the support device comprises at least two support arms on which the at least one rotary device and/or the motor device are arranged, the at least two support arms being connected to each other in a rotatable manner at a central point.

9. The rotation device according to claim 3, wherein the roll rotation axis is inclined at a predetermined angle with respect to a horizontal reference plane such as to match an inclination angle of the generator rotation axis.

10. The rotation device according to claim 1, further comprising:
    a control unit for starting and stopping the rotation device, adjusting a rotation speed of the wind turbine generator, adjusting a predetermined angle, adjusting a ramp-up speed of the wind turbine generator, adjusting a force applied on the wind turbine generator by the rotation device, emergency stopping the rotation device and/or adjusting a torque of the at least one rotary device;
    a battery unit for supplying the rotation device with electrical power;
    a displacing device for displacing the rotation device;
    at least one distance sensor for determining a distance between the rotation device and an obstacle and/or object;
    a brush for cleaning the outer surface of the wind turbine generator; and/or
    an encoder device for determining a number of rotations of the wind turbine generator induced by the rotation device.

11. The rotation device according to claim 1, wherein the rotation device is further configured to rotate a main bearing of the wind turbine such that grease provided inside the main bearing is uniformly distributed and/or such that stand still marks on the inside of the main bearing are avoided, the main bearing being configured to be rotated by wind energy.

12. A method for rotating a wind turbine generator that is configured to be rotated by wind energy and to convert the wind energy into electrical energy, the method comprising:
    coupling at least one rotary device with an outer surface of the wind turbine generator by elevating the at least one rotary device;
    driving the at least one rotary device using a motor device such as to rotate the wind turbine generator about a generator rotation axis which coincides with a direction along which a main shaft of a wind turbine extends;
    separating the at least one rotary device from the outer surface of the wind turbine generator by lowering the at least one rotary device.

13. The method according to claim 12, further comprising:
    rotating the wind turbine generator in a state in which the wind turbine generator is not rotated by wind energy;
    rotating the wind turbine generator such as to simulate winds;
    rotating a main bearing of the wind turbine and/or a main shaft of the wind turbine by rotating the wind turbine generator with the at least one rotary device;
    rotating the wind turbine generator, the main bearing and/or the main shaft during assembly of a nacelle of the wind turbine such as to access different parts of the wind turbine generator, the main bearing and/or the main shaft and facilitating the assembly; and/or rotating the wind turbine generator such as to fix gutter shields all around the wind turbine generator.

14. The method according to claim 12, which is executed using a rotation device that rotates the wind turbine generator.

* * * * *